US011871202B2

(12) United States Patent
Harris et al.

(10) Patent No.: US 11,871,202 B2
(45) Date of Patent: Jan. 9, 2024

(54) ACTUATOR MODULE WITH IMPROVED DAMAGE RESISTANCE

(71) Applicant: Google LLC, Mountain View, CA (US)

(72) Inventors: Neil John Harris, Los Altos, CA (US); Timothy A. Gladwin, Mountain View, CA (US); Rajiv Bernard Gomes, San Jose, CA (US); Anthony King, San Jose, CA (US); Jason David Walker, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/628,767

(22) PCT Filed: Jul. 31, 2019

(86) PCT No.: PCT/GB2019/052146
§ 371 (c)(1),
(2) Date: Jan. 20, 2022

(87) PCT Pub. No.: WO2021/019195
PCT Pub. Date: Feb. 4, 2021

(65) Prior Publication Data
US 2022/0272457 A1 Aug. 25, 2022

(51) Int. Cl.
*H04R 9/04* (2006.01)
*H04R 7/04* (2006.01)

(52) U.S. Cl.
CPC ............... *H04R 9/047* (2013.01); *H04R 7/04* (2013.01); *H04R 9/043* (2013.01); *H04R 2209/027* (2013.01); *H04R 2499/11* (2013.01)

(58) Field of Classification Search
CPC .......... H04R 9/047; H04R 7/04; H04R 9/043; H04R 2209/027; H04R 2499/11
See application file for complete search history.

(56) References Cited

U.S. PATENT DOCUMENTS 5,896,076 A 4/1999 van Namen
6,208,237 B1 3/2001 Saiki et al.
(Continued)

FOREIGN PATENT DOCUMENTS

CN 101964579 2/2011
CN 205142501 4/2016
(Continued)

OTHER PUBLICATIONS

International Preliminary Report on Patentability International Appln. No. PCT/GB2019/052146, dated Feb. 1, 2022, 7 pages.
(Continued)

*Primary Examiner* — Sunita Joshi
(74) *Attorney, Agent, or Firm* — Fish & Richardson P.C.

(57) ABSTRACT

An actuator module includes a base plate extending in a plane, a voice coil connected to the base plate, and a magnet assembly that includes a back side facing the base plate and a front side facing away from the base plate. The magnet assembly includes a base layer and sidewalls defining a cup and an inner element including a center magnet mounted within the cup. The sidewalls include a first and second pair of sidewalls. The actuator module includes a rigid frame attached to the base plate, the rigid frame including four stubs. The actuator module also includes a plurality of springs suspending the magnet assembly relative to the frame and base plate, the plurality of springs including a first spring attached to the frame at a first pair of the four stubs and a second spring attached to the frame at a second pair of the four stubs.

19 Claims, 7 Drawing Sheets

(56) References Cited

U.S. PATENT DOCUMENTS

| | | | |
|---|---|---|---|
| 10,080,081 | B1 | 9/2018 | Zhang |
| 10,216,231 | B1 | 2/2019 | Landick |
| 2006/0115107 | A1 | 6/2006 | Vincent et al. |
| 2012/0170792 | A1 | 7/2012 | Li et al. |
| 2014/0185839 | A1 | 7/2014 | Hashimoto et al. |
| 2017/0245057 | A1 | 8/2017 | Grazian et al. |
| 2018/0297075 | A1 | 10/2018 | Ling et al. |
| 2022/0303692 | A1 | 9/2022 | Starnes et al. |

FOREIGN PATENT DOCUMENTS

| | | | | |
|---|---|---|---|---|
| CN | 205792135 | | 12/2016 | |
| CN | 205792135 U | * | 12/2016 | |
| CN | 108605185 | | 9/2018 | |
| CN | 110401744 | | 11/2019 | |
| EP | 0845920 | | 6/1998 | |
| EP | 0845920 A2 | * | 6/1998 | .............. H04M 1/03 |
| EP | 845920 A2 | * | 6/1998 | .............. H04M 1/03 |
| JP | 2002219412 | | 8/2002 | |
| JP | 2002336786 | | 11/2002 | |
| JP | 2009171063 | | 7/2009 | |
| WO | WO 2007/045908 | | 4/2007 | |
| WO | WO 2021/019195 | | 2/2021 | |

OTHER PUBLICATIONS

International Search Report and Written Opinion in International Appln. No. PCT/GB2019/052146, dated Apr. 15, 2020, 10 pages.

International Search Report and Written Opinion in International Appln. No. PCT/US2020/063574, dated May 11, 2021, 23 pages.

International Preliminary Report on Patentability in International Appln. No. PCT/US2020/063574, dated Jun. 23, 2022, 16 pages.

Jinshan "Study on Drive Control of Linear Electromagnetic Actuator," Master's Thesis, Chongqing University, Mar. 15, 2017, 1 page (English abstract only).

Office Action in Chinese Appln. No. 201980099009.3, dated Oct. 9, 2023, 19 pages (with English translation).

Shahosseini et al., "Optimization and Microfabrication of High Performance Silicon-Based MEMS Microspeaker," IEEE Sensors Journal, Aug. 22, 2012 13(1):273-284.

* cited by examiner

ACTUATOR MODULE WITH IMPROVED DAMAGE RESISTANCE

CROSS-REFERENCE TO RELATED APPLICATIONS

This application is a National Stage Application under 35 U.S.C. § 371 and claims the benefit of International Application No. PCT/GB2019/052146, filed Jul. 31, 2019. The disclosures of the foregoing applications are incorporated herein by reference in their entirety.

BACKGROUND

Many conventional moving magnet actuators can be damaged as a result of the actuators being dropped. In particular, the voice coil and magnets of the moving magnet actuators can be fragile, making them especially prone to drop damage.

SUMMARY

Disclosed are actuator modules with improved damage resistance compared to conventional modules. The actuator modules may be suitable for panel audio loudspeakers, especially those incorporated in mobile devices (e.g., mobile phones). For example, implementations of such actuator modules feature components, such as a back plate, suspension, and a frame, which are configured to effectively dissipate a force that results from the actuator module being dropped, therefore preventing damage to the components of the actuator module.

In general, in a first aspect, an actuator module, includes a base plate extending in a plane and a voice coil connected to the base plate, the voice coil defining a coil axis perpendicular to the plane. The actuator module also includes a magnet assembly that includes a back side facing the base plate and a front side facing away from the base plate. The magnet assembly also includes a base layer and sidewalls defining a cup and an inner element including a center magnet mounted within the cup. The magnet assembly further includes a back plate extending parallel to the plane. The sidewalls include a first pair of sidewalls on opposing sides of the cup and a second pair of sidewalls on opposing sides of the cup and adjacent to the first pair of sidewalls, the sidewalls and inner element being separated by an air gap. The actuator module further includes a rigid frame attached to the base plate, the rigid frame including four stubs, each facing a corresponding one of the sidewalls. The actuator module also includes a plurality of springs suspending the magnet assembly relative to the frame and base plate so that the voice coil extends into the air gap. The plurality of springs including a first spring attached to the frame at a first pair of the four stubs respectively facing the first pair of sidewalls and attached to the magnet assembly at the second pair of sidewalls on the front side of the magnet assembly. The plurality of springs further including a second spring attached to the frame at a second pair of the four stubs respectively facing the second pair of sidewalls and attached to the magnet assembly at the first pair of sidewalls on the back side of the magnet assembly.

Implementations of the method can include one or more of the following features. In some implementations, a width of each spring varies along a length of the spring.

In some implementations, an inner surface of the four sidewalls defines a first quadrilateral shape with rounded corners and the voice coil defines a second quadrilateral shape with rounded corners, the rounded corners of both the first and second quadrilateral shapes being concentric.

In some implementations, the inner element of the magnet assembly defines a first quadrilateral shape with rounded corners and the voice coil defines a second quadrilateral shape with rounded corners, the rounded corners of both the first and second quadrilateral shapes being concentric.

The sidewalls can each comprise a portion of a ring magnet. The center magnet and the ring magnet can have their corresponding magnetic poles aligned in opposite directions. In some implementations, the magnetic pole of the center magnet is aligned parallel to the coil axis and the magnetic pole of the ring magnet is aligned parallel to the coil axis.

In some implementations, the sidewalls each include a portion of a front ring plate formed from a soft magnetic material, the ring magnet being arranged between the front ring plate and the back plate. In other implementations, the sidewalls each include an outer surface facing the frame, and a section of the outer surface formed by the ring magnet is recessed relative to a section of the outer surface formed by the front ring plate.

The inner element can include a front center plate comprising a soft magnetic material, the center magnet being arrangement between the front center plate and the back plate. In some implementations, the inner element comprises a bucking magnet on an opposite side of the front center plate from the center magnet. The center magnet and bucking magnet can have their corresponding magnetic poles aligned in opposite directions. The magnetic pole of the center magnet can be aligned parallel to the coil axis and the magnetic pole of the bucking magnet can be aligned parallel to the coil axis.

In some implementations, the springs allow the magnet assembly to vibrate in a first natural resonant mode in a direction along the coil axis and in a second natural resonant mode perpendicular to the coil axis, a frequency of the second natural resonant mode, f2, being greater than a frequency of the first natural resonant mode, f1. The second natural resonant mode, f2, can be approximately two times the first natural resonant mode, f1.

In some implementations, the actuator module further includes a hood enclosing the magnet assembly and voice coil in a space defined by the hood and the base plate.

In another aspect, the subject matter features a panel audio loudspeaker including the actuator module and a panel attached to the base plate of the actuator module. The panel can include a display panel.

In yet another aspect, a mobile device or wearable device includes a housing, the panel audio loudspeaker, and an electronic control module electrically coupled to the voice coil of the actuator module and programmed to energize the voice coil to couple vibrations to the panel to produce an audio response from the panel. The mobile device can be a mobile phone or a tablet computer. The wearable device can be a smart watch or head-mounted display.

Among other advantages, embodiments feature an actuator module that has a decreased chance of failure from mechanical stress caused by the actuator module being dropped, as compared to conventional actuator modules.

Other advantages will be evident from the description, drawings, and claims.

BRIEF DESCRIPTION OF THE DRAWINGS

Like reference symbols in the various drawings indicate like elements.

DETAILED DESCRIPTION

Figure 1:
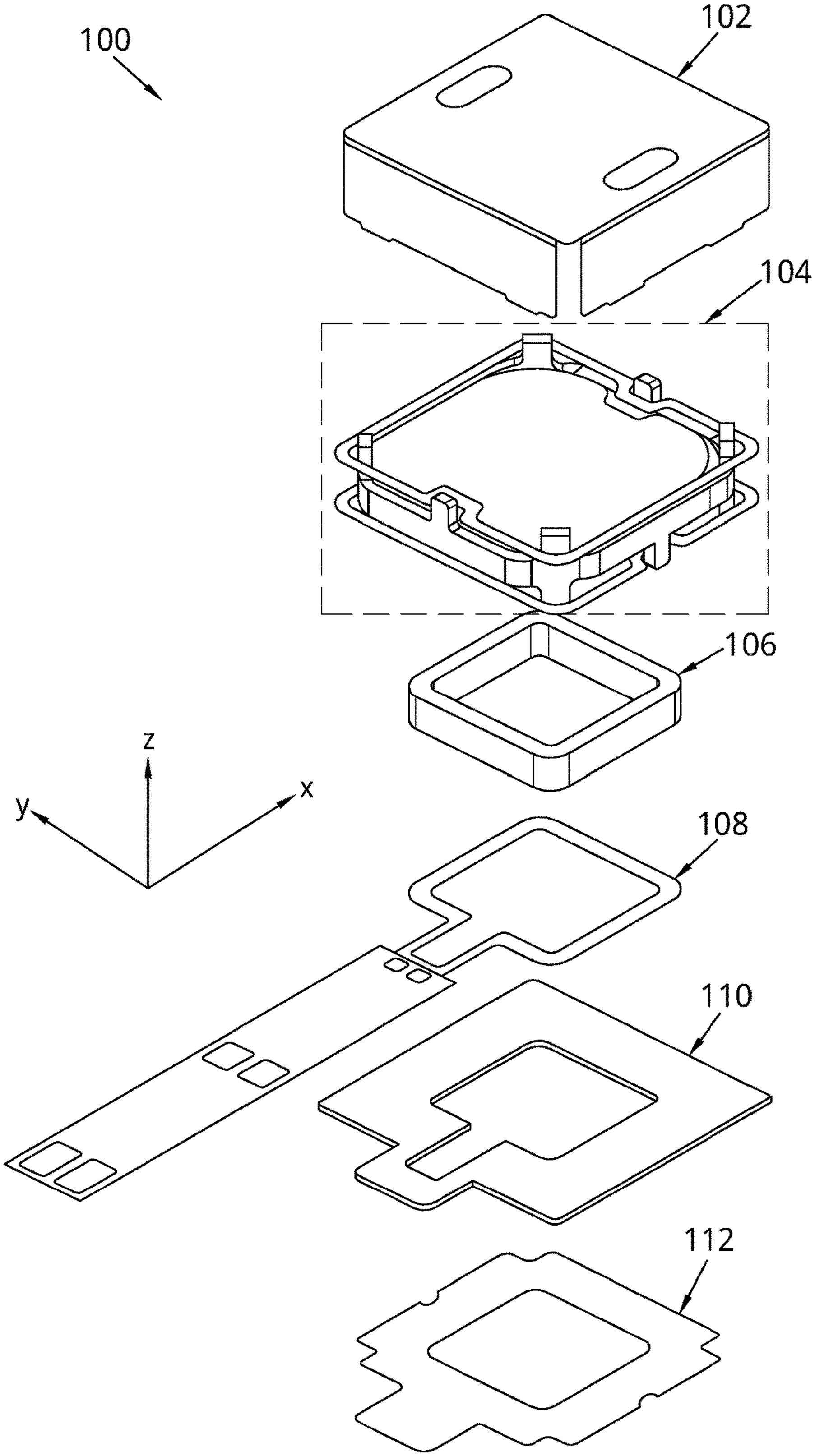
FIG. 1 is a perspective exploded view of an actuator module, which includes a motor module.

Referring to FIG. 1, an actuator module 100 includes a hood 102, a motor module 104, a voice coil 106, and a baseplate 110. A printed circuit board (PCB) 108 is attached to baseplate 110 on one side, and a pressure sensitive adhesive (PSA) 112 is attached on the other side of the baseplate. Hood 102, motor module 104, and voice coil 106 are all connected to baseplate 110, with the hood and the baseplate forming an enclosure that protects the motor module 104 and the voice coil. PSA 112 allows module 100 to be affixed to a panel, such as a flat panel display of a mobile device. A Cartesian coordinate system is shown in FIG. 1 for reference.

Actuator module 100 can be relatively compact. For example, hood 102, which has a substantially square profile in the x-y plane, can have an edge length (i.e., in the x- or y-directions) of about 25 mm or less (e.g., 20 mm or less, 15 mm or less, such as 14 mm, 12 mm, 10 mm or less). The actuator module's height (i.e., its dimension in the z-direction) can be about 10 mm or less (e.g., 8 mm or less, 6 mm or less, 5 mm or less).

During operation, an electric current is applied to voice coil 106 via PCB 108. The resulting magnetic flux interacts with a suspended magnet that is part of motor module 104 (discussed below), and the resulting vibrations are transferred via baseplate 110 to the panel.

Figure 2A:
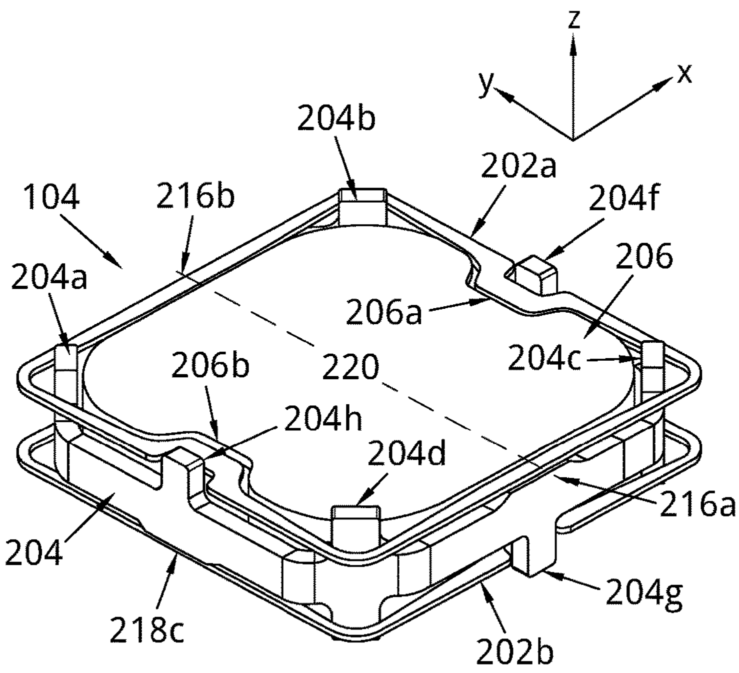
FIG. 2A is an enlarged view of the motor module of FIG. 1.
Figure 2B:
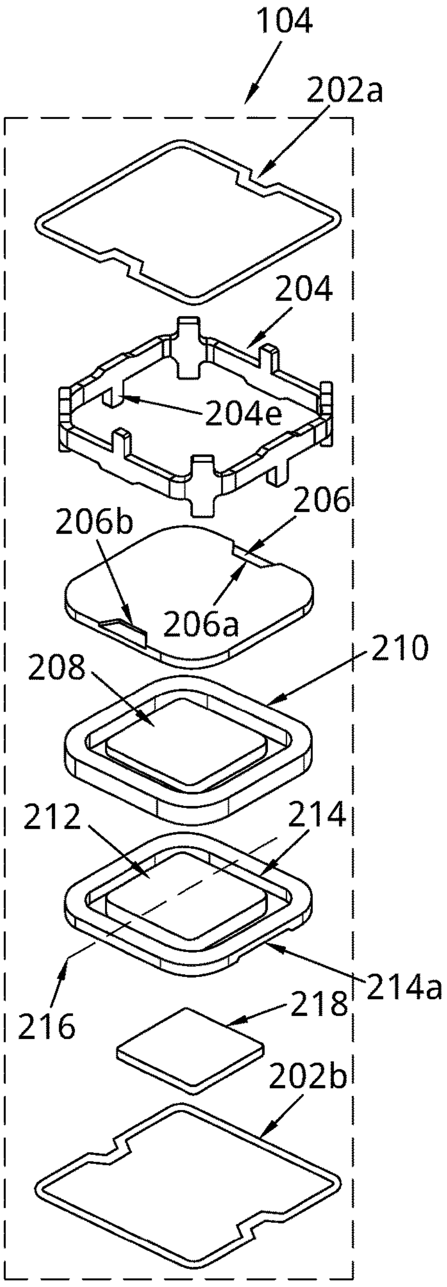
FIG. 2B is an exploded view of the motor module of FIG. 2A.

Referring to FIGS. 2A and 2B, motor module 104 includes a frame 204, a magnet assembly, and a pair of springs 202*a* and 202*b* that suspends the magnet assembly from the frame. The magnet assembly includes a back plate 206 to which a center magnet 208 and a ring magnet 210 are attached. Back plate 206 and ring magnet 210 can make up a magnetic cup, having sidewalls defined by the inside edge of the ring magnet. Center magnet 208 and ring magnet 210 are sized and shaped so that the center magnet fits within a gap defined by the ring magnet, as shown by their relative placement in FIG. 2B. The gap between center magnet 208 and ring magnet 210 can be about 1.2 mm or less (e.g., 1.15 mm or less, 1.1 mm or less, 1.05 mm or less, 1 mm or less).

The magnet assembly also includes a front center plate 212 and a front ring plate 214, which are attached to bottom surfaces of center magnet 208 and ring magnet 210, respectively. The magnet assembly further includes a bucking magnet 218, which is attached to front center plate 212. Front center plate 212 and front ring plate 214 are sized and shaped so that the front center plate fits with a gap defined by the front ring plate, as shown by their relative placement in FIG. 2B. Front center plate 212 and front ring plate 214 can be soft magnetic materials, e.g., ones having a high relative permeability. For example, the soft magnetic material may have a relative permeability of about 100 or more (e.g., about 1,000 or more, about 10,000 or more). Examples include high carbon steel and vanadium permendur. In some embodiments, the soft magnetic material can be a corrosion resisting high permeability alloy such as a ferritic stainless steel.

At each corner of frame 204 are posts 204*a*-204*d* that attach the frame to hood 102 and baseplate 110. That is, top surfaces of posts 204*a*-204*d* are attached to hood 102, while bottom surfaces of the posts are attached to baseplate 110. Frame 204 also includes stubs 204*e*-204*h*, which are positioned on the sides of the frame, between two of posts 204*a*-204*d*. Stubs 204*e* and 204*g* each have a bottom surface that attaches to baseplate 110.

While frame 204 has an approximately square shape when viewed in the xy-plane, each corner of the frame is curved so that the frame has dull corners. Between each of the corners of frame 204 are portions of the frame that are substantially straight along their outside edges. The straight portions of frame 204 attach the frame to hood 102. Stubs 204*e*-204*h* extend in the z-direction allowing for an increased area of contact with hood 102, as compared to a frame that does not include the stubs.

While the straight portions of frame 204 attach to hood 102, the outside edge of springs 202*a* and 202*b* do not contact hood 102. That is, a first distance measured between the inside edge of hood 102 and the outside edge of spring 202*a* or 202*b* is greater than a second distance measured between the inside edge of hood 102 and the outside edge of the straight portions of frame 204, where the first and second distances are measured parallel to the x or y-axes.

Spring 202*a* is attached (e.g., welded) to frame 204 at connection points 216*a* and 216*b*. Spring 202*b* is attached to frame 204 at a connection point 218*c*. While obscured in the view of FIG. 2B, spring 202*b* is attached to frame 204 at an additional connection point that is symmetric to connection point 218*c* about an axis 220 that runs parallel to the y-axis.

Springs 202*a* and 202*b* share approximately the same shape when viewed in the xy-plane. The corners of springs 202*a* and 202*b*, as viewed in the xy-plane, are curved. Two sides of springs 202*a* and 202*b*, between the corners of the springs, are substantially straight. The remaining two sides of springs 202*a* and 202*b* are curved inward in a "c" shape. One example of the benefit provided by the c-shaped portions of springs 202*a* and 202*b* is that they allow stubs 204*e*-204*h* to extend in the z-direction.

Spring 202*a* is attached to back plate 206 at connection points 206*a* and 206*b*. Back plate 206 includes two slots at the locations of connection points 206*a* and 206*b*, so that spring 202*a* is significantly flush with the top surface of the back plate. The shape of the slots of back plate 206 are curved in approximately the same c-shaped curvature as are springs 202*a* and 202*b*. The c-shaped portions of spring 202*a* and the corresponding c-shaped slot of back plate 206 facilitate the connection between these components at connection points 206*a* and 206*b*.

A width of each spring 202*a* and 202*b* varies along a length of the spring. For example, a first width of spring 202*a* at connection point 216*a* or 216*b* is greater than a second width of the spring at the corners of the spring. The first width can be about 0.8 mm or less (e.g., 0.75 mm or less, 0.7 mm or less, 0.65 mm or less), while the second width can be about 0.35 mm or less (e.g., 0.3 mm or less, 0.25 mm or less, 0.2 mm or less). Similarly, a third width of spring 202*a* at connection points 206*a* or 206*b* is greater than the second width of the spring. The third width can be about 0.55 mm or less (e.g., 0.5 mm or less, 0.45 mm or less, 0.4 mm or less). The width of the spring decreases as it extends along any midpoint that is on the spring and between two corners of the spring to any corner of the spring. That is, as spring 202*a* extends from connection point 206*a* or 206*b* to a closest corner of the spring, the width of the spring decreases. Similarly, as spring 202*a* extends from connection point 216*a* or 216*b* to a closest corner of the spring, the width of the spring decreases.

While spring 202*a* is attached to back plate 206, spring 202*b* is attached to a bottom surface of front ring plate 214. FIG. 2B shows where spring 202*b* is attached to front ring plate 214 at a connection point 214*a*. While obscured in the view of FIG. 2, spring 202*b* is attached to front ring plate 214 at a connection point 214*b*, which is symmetric about an axis 230 that runs parallel to the x-axis. Just as back plate 206 includes c-shaped slots at the locations of connection points 216*a* and 216*b*, front ring plate 214 also includes corresponding c-shaped slots at the locations where spring 202*b* connects to the front ring plate.

During the operation of actuator module 100, springs 202*a* and 202*b* bend in the z-direction. By virtue of their connection to springs 202*a* and 202*b*, back plate 206, center magnet 208, ring magnet 210, front center plate 212, front ring plate 214, and bucking magnet 110 also move in the z-direction. The locations of the connections of springs 202*a* and 202*b* to motor module 104 are chosen so that the motor module has a desired resonant frequency.

Spring 202*b* includes c-shaped notches that correspond with connection point 214*a* and connection point 214*b* (not shown). The location of connection points 206*a* and 206*b* to baseplate 110 and connection points 214*a* and 214*b* to front ring plate 214 can be chosen to facilitate motor module 104 to exhibit a desired resonant behavior. For example, connection points 206*a* and 206*b* are not placed above connection points 214*a* and 214*b*. This placement of the connection points facilitates motor module 104 to exhibit a desired resonant behavior, e.g., to facilitate the motor module to exhibit a desired rocking mode.

For example, if actuator module 100 is dropped, springs 202*a* and 202*b* and their corresponding connection points can facilitate motor module 104, e.g., the magnet assembly of the motor module, to exhibit a rocking mode. The frequency of the rocking mode can be at roughly twice a resonant frequency displayed by motor module 104. Because the rocking mode is at roughly twice the resonant frequency of motor module 104, it is not a favorable excitation for the motor module during normal operation. However, because the rocking mode is the first normal mode above the resonant frequency, motor module 104 can exhibit the rocking mode if actuator module 100 is dropped, and the force of the impact can be at least partially dissipated by the rocking mode.

The thickness to width ratio of the springs, favors displacement of motor module 104 in the z-direction over displacement of the motor module in the x or y-directions. However, during abnormal operation of actuator module 100, such as when the actuator is dropped, there may be some lateral displacement (e.g., displacement in the x or y-directions) of motor module 104. The lateral displacement causes uneven forces in the z-direction, causing the rocking mode which dissipates the energy of the drop over time.

Not only can the placement of the connection points 216*a*, 216*b*, 214*a*, and 214*b* be chosen to facilitate a desired resonant behavior of motor module 104, the shape of springs 202*a* and 202*b* can affect the resonant behavior of the motor module. For example, the thickness of springs 202*a* and 202*b*, as measured in the z-direction, or the width of the springs, as measured in the x and y-directions, can be increased or decreased to promote a desired resonant behavior of motor module 104, e.g., to promote a certain fundamental frequency. In addition, the thickness of frame 204 or the width of the frame can be increased or decreased to promote a desired resonant behavior of motor module 104.

The dimensions of springs 202*a* and 202*b*, as measured in the x and y-dimensions, can be approximately equal. For example, springs 202*a* and 202*b* can fit within a square having side lengths of about 13.5 mm or less (e.g., 13.25 mm or less, 13 mm or less, 12.75 mm or less, 12.5 mm or less). Springs 202*a* and 202*b* can be made from a hard alloy having a high yield strength, e.g., a yield strength of 1400 MPa or greater. For example, springs 202*a* and 202*b* can be made from 301 stainless steel.

Figure 3:
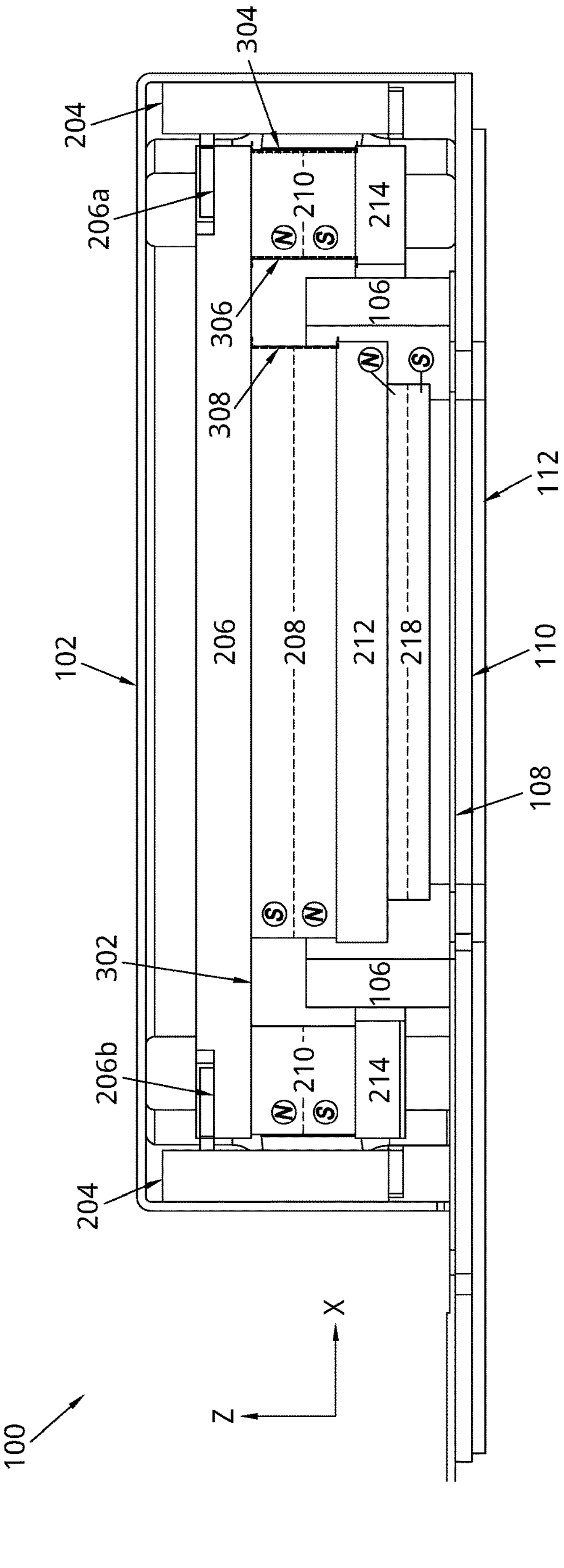
FIG. 3 is a cross-sectional view of the actuator module of FIG. 1A.

Referring now to FIG. 3, a cross-sectional view of actuator module 100 shows an air gap 302, which separates center magnet 208 and ring magnet 210, as well as front center plate 212 and front ring plate 214. Voice coil 106 is positioned in air gap 302. Center magnet 208, ring magnet 210, and bucking magnet 218 generate magnetic fields which pass perpendicularly to voice coil 106, i.e., in the x-direction. FIG. 3 also shows the relative polarities of each magnet, shown as "N" and "S". Center magnet 208 and ring magnet 210 have their corresponding magnetic poles aligned in opposite directions.

During the operation of actuator module 100, voice coil 106 is energized. When energized, voice coil 106 induces a magnetic field in air gap 302. Center magnet 208 and ring magnet 210 each experience a force due to the interaction of their magnetic fields with that induced by voice coil 106. The force experienced by center magnet 208 and ring magnet 210 cause these components to be displaced in the z-direction. By virtue of their respective connections, back plate 206, front center plate 212, front ring plate 214, and bucking magnet 218 are displaced in the z-direction during operation of actuator assembly 100.

Bucking magnet 218 is provided to focus the magnetic field generated by center magnet 208 and ring magnet 210, so that the magnetic flux passing though voice coil 106 along the x-axis is maximized. The polarity of bucking magnet 218 is chosen to oppose the magnetic flux of center magnet 208 and ring magnet 210. That is, center magnet 208 and bucking magnet 218 have their corresponding magnetic poles aligned in opposite directions. Bucking magnet 218 can also reduce the stray magnetic flux generated by center magnet 208 and ring magnet 210, e.g., reduce the magnetic flux that does not pass perpendicularly to voice coil 106.

During normal operation of actuator module 100, moving components of the actuator are displaced primarily in the z-direction. Outside of normal operation, the moving components of the module may be displaced in the x or y-directions, e.g., as a result of the module being dropped, or as a result of a mobile device that includes the module being dropped. Displacement in the x or y-directions of the moving components can cause damage to actuator module 100. Accordingly, hood 102 and frame 204 serve as physical stops to prevent significant displacement of the moving components of actuator module 100.

For example, when actuator module 100 is dropped, baseplate 110, front ring plate 214, or both may contact frame 204, preventing further displacement of these components in the x or y-directions. Baseplate 110 and front ring plate 214 can be made from one or more materials that are able to withstand the shock caused by contacting frame 204. These components are also sized to prevent ring magnet 210 from contacting frame 204, therefore preventing the magnet from being damaged as a result of contacting the frame. For example, a section of the outer surface formed by ring magnet 210 is recessed relative to a section of the outer surface formed by front ring plate 214. Similarly, a section of the output surface formed by ring magnet 210 is recessed relative to a section of the outer surface formed by baseplate 110. One of the recessed portions of ring magnet 210 is accented by a white dotted line 304. In other words, a first gap between an inner surface of frame 204 and the outer surface of front ring plate 214 and a second gap between the inner surface of frame 204 and an outer surface of baseplate 110 are smaller than a third gap between the inner surface of the frame and the outer surface of ring magnet 210. For example, the difference between the first and third gaps and the second and third gaps can be about 0.05 mm or less (e.g., 0.045 mm or less, 0.04 mm or less, 0.035 mm or less).

Similarly, to protect ring magnet 210, a section of the inner surface formed by the ring magnet is recessed relative to a section of the inner surface of front ring plate 214. One of the recessed portions of ring magnet 210 is accented by a white dotted line 306. In other words, a gap between voice coil 106 and front ring plate 214 is smaller than a gap between the voice coil and ring magnet 210. This relative spacing prevents ring magnet 210 from contacting voice coil 106.

Similarly, to protect center magnet 208, a section of the outer surface formed by the center magnet is recessed relative to a section of the outer surface formed by front center plate 212. One of the recessed portions of center magnet 208 is accented by a white dotted line 308. In other words, A gap between voice coil 106 and front center plate 212 is smaller than a gap between voice coil 106 and center magnet 208. This relative spacing prevents center magnet 208 from contacting voice coil 106.

Figure 4A:
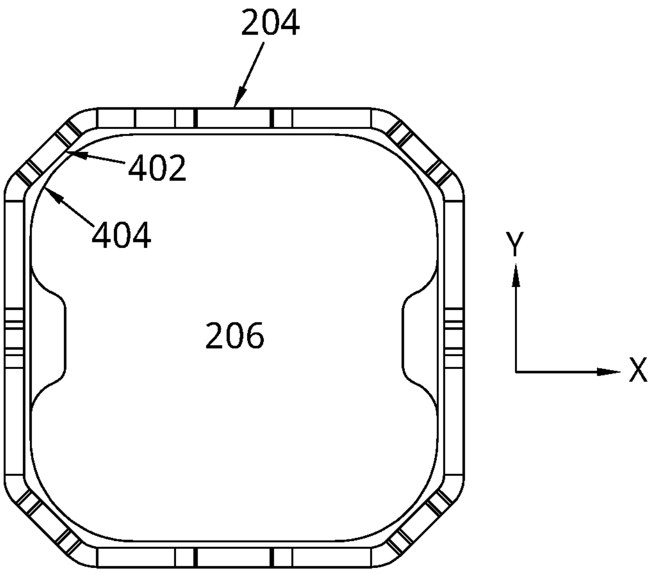
FIG. 4A, is a top view of a frame and baseplate of the actuator module of FIGS. 1A and 3.

The relative shape of other components of actuator module 100 can be chosen to prevent damage that may be caused by the module being dropped. For example, back plate 206 can be shaped so as to efficiently dissipate the forces generated when actuator module 100 is dropped. FIG. 4A is a top view of frame 204 and back plate 206. FIG. 4A shows how the corners of back plate 206 are shaped to dissipate forces that could otherwise damage components of actuator module 100. For example, the arcs that form the corners of back plate 206 are chosen so the portion of the baseplate that impacts frame 204 is large enough to effectively dissipate the impact force. If back plate 206 or front ring plate 214 make contact with frame 204, hood 102 can prevent the frame from being significantly displaced as a result of the force exerted on it by the back plate or the front ring plate. In some embodiments, the radius of curvature of the inside corner arc of voice coil 106 and the radius of curvature of the outside corner arc of front ring plate 214 are approximately the same. In certain embodiments, the radius of curvature of the outside corner arc of voice coil 106 and the radius of curvature of the inside corner arc of front ring plate 214 are approximately the same.

Referring to FIG. 4A, each corner of frame 204 is closest to a corresponding corner of voice coil 106, back plate 206, front center plate 212, and front ring magnet 214. The corners of some or all of voice coil 106, back plate 206, front center plate 212, and front ring magnet 214 are concentric. Concentric corners are corners that form arcs whose circles of best fit are concentric with respect to one another. For example, referring to FIG. 4B, a corner of voice coil 106 is concentric with a corresponding corner of front ring magnet 214. That is, a circle that best fits the arc formed by the corner of voice coil 106 is concentric with a circle that best fits the arc formed by a corresponding corner of front ring magnet 214.

Concentric corners can nest within one another, allowing a greater surface area of contact between the corners, as compared to the surface area of contact between corners that are not concentric. Accordingly, the corresponding corners of voice coil 106, front center plate 212, and front ring magnet 214 are concentric with respect to one another.

Figure 4B:
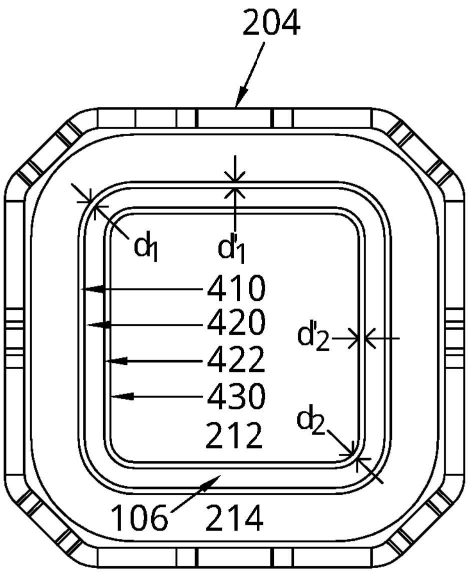
FIG. 4B is a top view of the actuator module of FIGS. 1A, 3, and 4A, which includes a voice coil, a front center plate, a front ring plate, and the frame of FIG. 4A.

Similarly, the shapes of the corners of other components of actuator module 100 can be chosen so that the corners that may contact one another when the module is dropped have a large enough surface area to effectively dissipate forces generated during the drop. FIG. 4B is a top view of voice coil 106, frame 204, front center plate 212, and front ring plate 214. The radii of curvature of the corners of front center plate 212 and front ring plate 214 are chosen so as to maximize the contacting surface area between these components and voice coil 106 if actuator module 100 is dropped, thereby distributing any force associated with impact between the two components at the corners over a greater area. The shape of an inner edge 410 of front ring plate 214 is chosen so as to maximize its contact with an outer edge 420 of voice coil 106 if the front ring plate is displaced in the x and/or y-directions, e.g., if actuator module 100 is dropped. The shape of an inner edge 422 of voice coil 106 is chosen so as to maximize its contact with an outer edge 430 of front center plate 212 if the front center plate is displaced in the x and/or y-directions, e.g., if actuator module 100 is dropped.

To further help maximize the contacting surface area between voice coil 106 and front ring plate 214 during displacement in the x and/or y-directions, a distance, $d_1$, between the outside corner arc of voice coil 106 and the inside corner arc of front ring plate 214 is larger than a distance, $d'_1$, between the outside middle edge of the voice coil and the inside middle edge of the front ring plate. Similarly, a distance, $d_2$, between the outside corner arc of front center plate 212 and the inside corner arc of voice coil 106 is larger than a distance, $d'_2$, between the outside middle edge of the front center plate and the inside middle edge of the voice coil.

In some embodiments, actuator module 100 can include a damping material between all or some of the edges of components that may make contact with one another, e.g., if actuator module 100 is dropped. For example, a damping material can be positioned between an inner edge 402 of frame 204 and an outer edge 404 of baseplate 110. In some embodiments, a damping material can be placed between inner edge 410 of front ring plate 214 and outer edge 420 of voice coil 106. In other embodiments, a damping material can be placed between inner edge 422 of voice coil 106 and outer edge 430 of front center plate 212.

In some embodiments, a damping material can be positioned between a top surface of baseplate 110 and a bottom surface of hood 102. In other embodiments, a damping material can be positioned between hood 102 and frame 204. The damping material can be any material that is able to reduce the force of impact between components that contact one another. For example, the damping material can be a foam, a pressure sensitive adhesive, a ferrofluid, or a compliant polymer, e.g., one having a low stiffness and high elongation after curing.

Figure 5A:
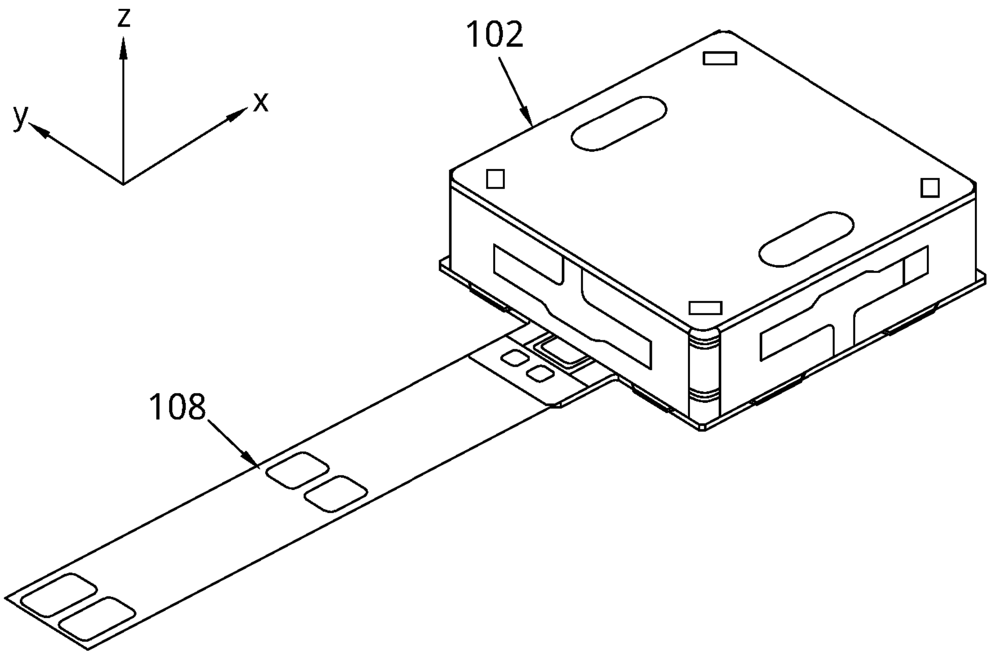
FIG. 5A is a perspective top view of the actuator module of FIGS. 1A, 3-4B.
Figure 5B:
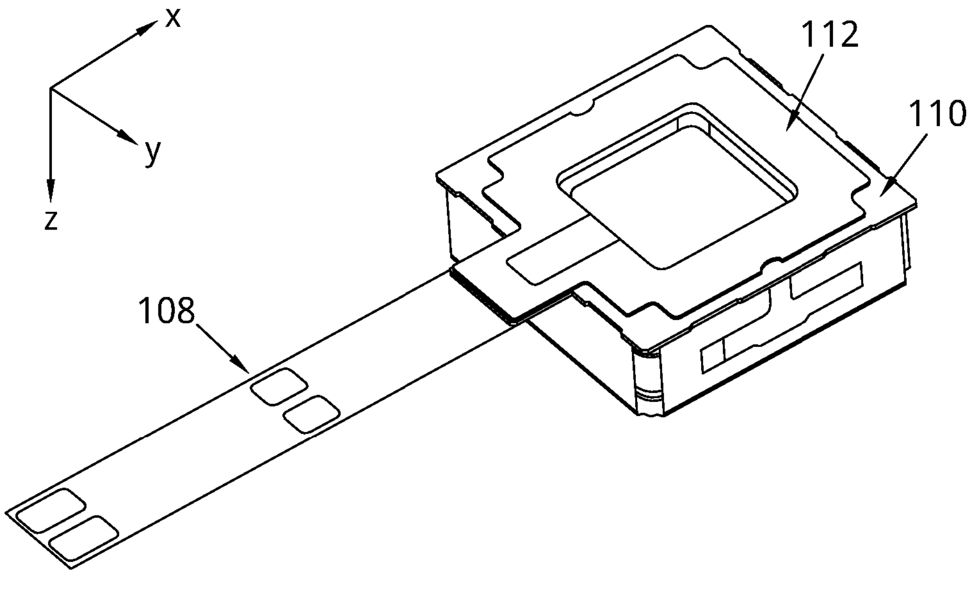
FIG. 5B is a perspective bottom view of the actuator module of FIGS. 1A, 3-5A.

The components of actuator module 100 are packaged together, as illustrated in FIGS. 5A and 5B, which are a perspective top view and a perspective bottom view of the actuator module, respectively. Referring to FIG. 5A, PCB 108 is positioned above baseplate 110. PCB 108 is a substrate for electronic components that interface with actuator module 100. For example, PCB 108 can connect to electronic components that control the operation of actuator module 100. PCB 108 can be wholly or partly flexible. PCB 108 extends in the x-direction, e.g., to include a large enough surface area for the electrical components that are printed on its surface. PCB 108 can also include a ring-shaped structure that is housed within and enclosed by hood 102.

In addition to serving as an enclosure for the other components of actuator module 100, hood 102 also provides magnetic shielding. When actuator module 100 is housed in a mobile device, it is advantageous to reduce the magnetic flux present outside of hood 102, e.g., so that other electronic components of the mobile device are not affected by the magnetic fields generated by the magnets and voice coil 106. Accordingly, the material properties of hood 102 are chosen to provide the desired magnetic shielding. For example, the magnetic permeability of the one or more materials chosen for hood 102 should be high enough so that the hood acts as a shield, but not so high that the hood promotes the formation of magnetic fields that may be present as a result of other components housed in the mobile device. For example, the material or materials of hood 102 may have a relative permeability equal to or more than 100, equal to or more than 1000, or equal to or more than 10000. Examples include high carbon steel and vanadium permendur.

While the foregoing figures cover a specific embodiment of an actuator module, i.e., actuator module 100, more generally the principles embodied in this example can be applied in other designs too. For example, while magnet motor 104 has a substantially square footprint (i.e., in the x-y plane), other shapes are possible, such as substantially rectangular, oval, or round.

While actuator module 100 includes three magnets, in some implementations, an actuator module can include one, two, three, or more magnets. For example, while actuator module 100 includes ring magnet 210 and center magnet 208, in some embodiments, an actuator module can include either the ring magnet or the center magnet and one or more bucking magnets. In other embodiments, an actuator module can include either ring magnet 210 or center magnet 208 and no bucking magnet 218.

In some embodiments, an actuator module can include a cup magnet module, e.g., a magnet positioned in a cup made of a permeable material, such as steel. In some embodiments, the cup magnet module can be accompanied by one or more bucking magnets, while in other embodiments, an actuator module can include the cup magnet module and no bucking magnet.

In some embodiments, an actuator module can include a ring magnet, a yoke, and no bucking magnet. In other embodiments, an actuator module can include a ring magnet, a yoke, and one or more bucking magnets.

In some embodiments, the actuator module can include one or more radially magnetized magnets accompanied by zero, one, or more bucking magnets.

The magnets of actuator module 100 can be an iron magnet, a neodymium magnet, or a ferrite magnet, such as one composed of iron and nickel. In some embodiments, one or more of the magnets of actuator module 100 can be replaced by an electromagnet. In some embodiments, actuator module 100 can include high permeability materials.

In general, the relative polarities of the magnets, as shown with respect to FIG. 3, should be respected, such that reversing the polarity of one of the magnets shown in FIG. 3 should be accompanied by a reversal of the polarities of the other magnets.

In general, the actuator modules described above can be used in a variety of applications. For example, in some embodiments, actuator module 100 can be used to drive a panel of a panel audio loudspeaker, such as a distributed mode loudspeaker (DML). Such loudspeakers can be integrated into a mobile device, such as a mobile phone. For example, referring to FIG. 6, a mobile device 600 includes a device chassis 602 and a touch panel display 604 including a flat panel display (e.g., an OLED or LCD display panel) that integrates a panel audio loudspeaker. Mobile device 600 interfaces with a user in a variety of ways, including by displaying images and receiving touch input via touch panel display 604. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm).

Mobile device 600 also produces audio output. The audio output is generated using a panel audio loudspeaker that creates sound by causing the flat panel display to vibrate. The display panel is coupled to an actuator, such as a distributed mode actuator, or DMA. The actuator is a movable component arranged to provide a force to a panel, such as touch panel display 604, causing the panel to vibrate. The vibrating panel generates human-audible sound waves, e.g., in the range of 20 Hz to 20 kHz.

In addition to producing sound output, mobile device 600 can also produce haptic output using the actuator. For example, the haptic output can correspond to vibrations in the range of 180 Hz to 300 Hz.

Figure 6:
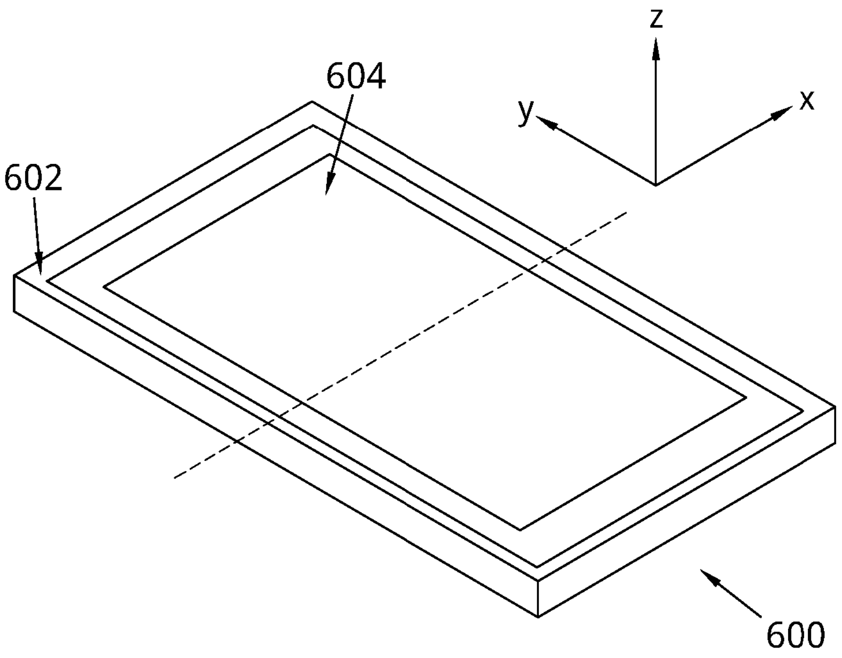
FIG. 6 is a perspective view of an embodiment of a mobile device.
Figure 7:
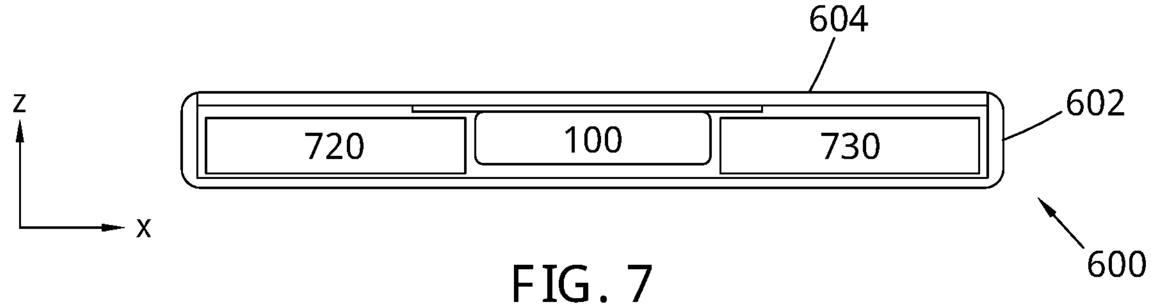
FIG. 7 is a schematic cross-sectional view of the mobile device of FIG. 6.

FIG. 6 also shows a dashed line that corresponds to the cross-sectional direction shown in FIG. 7. Referring to FIG. 7, a cross-section of mobile device 600 illustrates device chassis 602 and touch panel display 604. Device chassis 602 has a depth measured along the z-direction and a width measured along the x-direction. Device chassis 602 also has a back panel, which is formed by the portion of device chassis 602 that extends primarily in the xy-plane. Mobile device 600 includes actuator module 100, which is housed behind display 604 in chassis 602 and attached to the back side of display 604. For example, PSA 112 can attach actuator module 100 to display 604. Generally, actuator module 100 is sized to fit within a volume constrained by other components housed in the chassis, including an electronic control module 720 and a battery 730.

Figure 8:
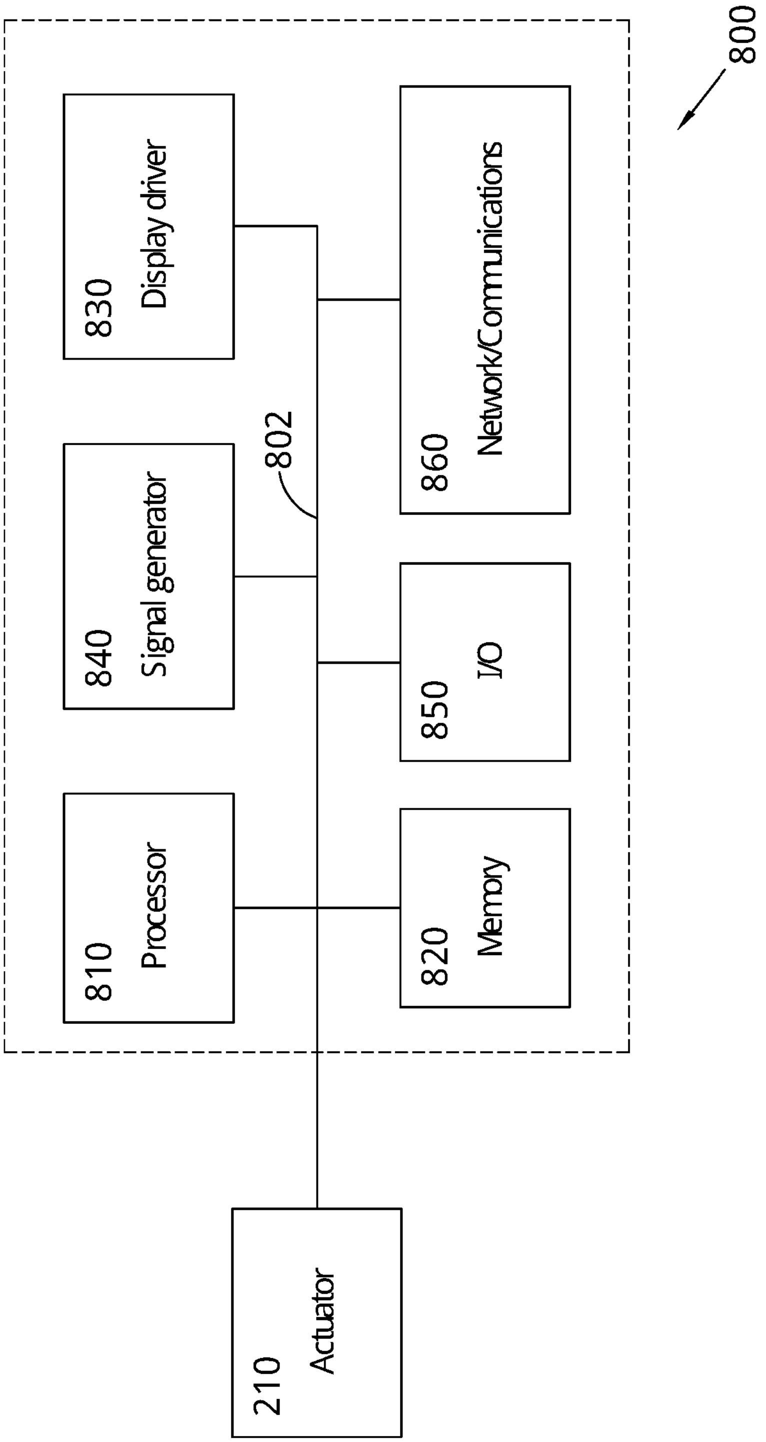
FIG. 8 is a schematic diagram of an embodiment of an electronic control module for a mobile device.

In general, the disclosed actuators are controlled by an electronic control module, e.g., electronic control module 720 in FIG. 7 above. In general, electronic control modules are composed of one or more electronic components that receive input from one or more sensors and/or signal receivers of the mobile phone, process the input, and generate and deliver signal waveforms that cause actuator module 100 to provide a suitable haptic response. Referring to FIG. 8, an exemplary electronic control module 800 of a mobile device, such as mobile device 600, includes a processor 810, memory 820, a display driver 830, a signal generator 840, an input/output (I/O) module 850, and a network/communications module 860. These components are in electrical communication with one another (e.g., via a signal bus 802) and with actuator module 100.

Processor 810 may be implemented as any electronic device capable of processing, receiving, or transmitting data or instructions. For example, processor 810 can be a microprocessor, a central processing unit (CPU), an application-specific integrated circuit (ASIC), a digital signal processor (DSP), or combinations of such devices.

Memory 820 has various instructions, computer programs or other data stored thereon. The instructions or computer programs may be configured to perform one or more of the operations or functions described with respect to the mobile device. For example, the instructions may be configured to control or coordinate the operation of the device's display via display driver 830, signal generator 840, one or more components of I/O module 850, one or more communication channels accessible via network/communications module 860, one or more sensors (e.g., biometric sensors, temperature sensors, accelerometers, optical sensors, barometric sensors, moisture sensors and so on), and/or actuator module 100.

Signal generator 840 is configured to produce AC waveforms of varying amplitudes, frequency, and/or pulse profiles suitable for actuator module 100 and producing acoustic and/or haptic responses via the actuator. Although depicted as a separate component, in some embodiments, signal generator 840 can be part of processor 810. In some embodiments, signal generator 840 can include an amplifier, e.g., as an integral or separate component thereof.

Memory 820 can store electronic data that can be used by the mobile device. For example, memory 820 can store electrical data or content such as, for example, audio and video files, documents and applications, device settings and user preferences, timing and control signals or data for the various modules, data structures or databases, and so on. Memory 820 may also store instructions for recreating the various types of waveforms that may be used by signal generator 840 to generate signals for actuator module 100. Memory 820 may be any type of memory such as, for example, random access memory, read-only memory, Flash memory, removable memory, or other types of storage elements, or combinations of such devices.

As briefly discussed above, electronic control module 800 may include various input and output components represented in FIG. 8 as I/O module 850. Although the components of I/O module 850 are represented as a single item in FIG. 8, the mobile device may include a number of different input components, including buttons, microphones, switches, and dials for accepting user input. In some embodiments, the components of I/O module 850 may include one or more touch sensor and/or force sensors. For example, the mobile device's display may include one or more touch sensors and/or one or more force sensors that enable a user to provide input to the mobile device.

Each of the components of I/O module 850 may include specialized circuitry for generating signals or data. In some cases, the components may produce or provide feedback for application-specific input that corresponds to a prompt or user interface object presented on the display.

As noted above, network/communications module 860 includes one or more communication channels. These communication channels can include one or more wireless interfaces that provide communications between processor 810 and an external device or other electronic device. In general, the communication channels may be configured to transmit and receive data and/or signals that may be interpreted by instructions executed on processor 810. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 860 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 600 to a mobile phone for output on that device and vice versa. Similarly, the network/communications module 860 may be configured to receive input provided on another device to control the mobile device. For example, an audible alert, visual notification, or haptic alert (or instructions therefor) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Other embodiments are in the following claims.

What is claimed is:

1. An actuator module, comprising:

a base plate extending in a plane;

a voice coil connected to the base plate, the voice coil defining a coil axis perpendicular to the plane;

a magnet assembly comprising:

- a back side facing the base plate and a front side facing away from the base plate,
- a base layer and sidewalls defining a cup,
- an inner element comprising a center magnet mounted within the cup, and
- a back plate extending parallel to the plane,
- wherein:
  - the sidewalls comprise a first pair of sidewalls on opposing sides of the cup and a second pair of sidewalls on opposing sides of the cup and adjacent to the first pair of sidewalls, the sidewalls and inner element being separated by an air gap, and
  - an inner surface of the sidewalls or the inner element of the magnet assembly defines a first quadrilateral shape, and the voice coil defines a second quadrilateral shape, corners of both the first and second quadrilateral shapes being concentric;

a rigid frame attached to the base plate, the rigid frame comprising four stubs each facing a corresponding one of the sidewalls; and a plurality of springs suspending the magnet assembly relative to the frame and base plate so that the voice coil extends into the air gap, the plurality of springs comprising a first spring attached to the frame at a first pair of the four stubs respectively facing the first pair of sidewalls and attached to the magnet assembly at the second pair of sidewalls on the front side of the magnet assembly, the plurality of springs comprising a second spring attached to the frame at a second pair of the four stubs respectively facing the second pair of sidewalls and attached to the magnet assembly at the first pair of sidewalls on the back side of the magnet assembly.

2. The actuator module of claim 1, wherein a width of each spring varies along a length of the spring.

3. The actuator module of claim 1, wherein the inner surface of the four sidewalls defines the first quadrilateral shape.

4. The actuator module of claim 1, wherein the inner element of the magnet assembly defines the first quadrilateral shape.

5. The actuator module of claim 1, wherein the sidewalls each comprise a portion of a ring magnet.

6. The actuator module of claim 5, wherein the center magnet and the ring magnet have their corresponding magnetic poles aligned in opposite directions.

7. The actuator module of claim 5, wherein the magnetic pole of the center magnet is aligned parallel to the coil axis and the magnetic pole of the ring magnet is aligned parallel to the coil axis.

8. The actuator module of claim 5, wherein the sidewalls each comprise a portion of a front ring plate formed from a soft magnetic material, the ring magnet being arranged between the front ring plate and the back plate.

9. The actuator module of claim 8, wherein the sidewalls each comprise an outer surface facing the frame, and wherein a section of the outer surface formed by the ring magnet is recessed relative to a section of the outer surface formed by the front ring plate.

10. The actuator module of claim 1, wherein the inner element comprises a front center plate comprising a soft magnetic material, the center magnet being arrangement between the front center plate and the back plate.

11. The actuator module of claim 10, wherein the inner element comprises a bucking magnet on an opposite side of the front center plate from the center magnet.

12. The actuator module of claim 11, wherein the center magnet and bucking magnet have their corresponding magnetic poles aligned in opposite directions.

13. The actuator module of claim 12, wherein the magnetic pole of the center magnet is aligned parallel to the coil axis and the magnetic pole of the bucking magnet is aligned parallel to the coil axis.

14. The actuator module of claim 1, wherein the springs allow the magnet assembly to vibrate in a first natural resonant mode in a direction along the coil axis and in a second natural resonant mode perpendicular to the coil axis, a frequency of the second natural resonant mode, f2, being greater than a frequency of the first natural resonant mode, f1.

15. The actuator module of claim 14, wherein f2 is approximately 2f1.

16. The actuator module of claim 1, further comprising a hood enclosing the magnet assembly and voice coil in a space defined by the hood and the base plate.

17. A panel audio loudspeaker comprising:

an actuator module comprising:

a base plate extending in a plane;

a voice coil connected to the base plate, the voice coil defining a coil axis perpendicular to the plane;

a magnet assembly comprising:

a back side facing the base plate and a front side facing away from the base plate, a base layer and sidewalls defining a cup, an inner element comprising a center magnet mounted within the cup, and a back plate extending parallel to the plane, wherein the sidewalls comprise a first pair of sidewalls on opposing sides of the cup and a second pair of sidewalls on opposing sides of the cup and adjacent to the first pair of sidewalls, the sidewalls and inner element being separated by an air gap;

a rigid frame attached to the base plate, the rigid frame comprising four stubs each facing a corresponding one of the sidewalls; and a plurality of springs suspending the magnet assembly relative to the frame and base plate so that the voice coil extends into the air gap, the plurality of springs comprising a first spring attached to the frame at a first pair of the four stubs respectively facing the first pair of sidewalls and attached to the magnet assembly at the second pair of sidewalls on the front side of the magnet assembly, the plurality of springs comprising a second spring attached to the frame at a second pair of the four stubs respectively facing the second pair of sidewalls and attached to the magnet assembly at the first pair of sidewalls on the back side of the magnet assembly; and a panel attached to the base plate of the actuator module, wherein the panel comprises a display panel.

18. A mobile device, comprising:

a housing;

a panel audio loudspeaker comprising:

an actuator module comprising:

a base plate extending in a plane;

a voice coil connected to the base plate, the voice coil defining a coil axis perpendicular to the plane;

a magnet assembly comprising:

a back side facing the base plate and a front side facing away from the base plate, a base layer and sidewalls defining a cup, an inner element comprising a center magnet mounted within the cup, and a back plate extending parallel to the plane, wherein the sidewalls comprise a first pair of sidewalls on opposing sides of the cup and a second pair of sidewalls on opposing sides of the cup and adjacent to the first pair of sidewalls, the sidewalls and inner element being separated by an air gap;

a rigid frame attached to the base plate, the rigid frame comprising four stubs each facing a corresponding one of the sidewalls, and a plurality of springs suspending the magnet assembly relative to the frame and base plate so that the voice coil extends into the air gap, the plurality of springs comprising a first spring attached to the frame at a first pair of the four stubs respectively facing the first pair of sidewalls and attached to the magnet assembly at the second pair of sidewalls on the front side of the magnet assembly, the plurality of springs comprising a second spring attached to the frame at a second pair of the four stubs respectively facing the second pair of sidewalls and attached to the magnet assembly at the first pair of sidewalls on the back side of the magnet assembly, and a panel attached to the base plate of the actuator module; and an electronic control module electrically coupled to the voice coil and programmed to energize the voice coil to couple vibrations to the panel to produce an audio response from the panel.

19. The mobile device of claim 18, wherein the mobile device is a mobile phone or a tablet computer.

* * * * *